United States Patent [19]

House

[11] Patent Number: 4,799,054
[45] Date of Patent: Jan. 17, 1989

[54] MOUSE OPERATING PAD

[75] Inventor: V. Dean House, Orem, Utah

[73] Assignee: Data Pad Corp., Provo, Utah

[21] Appl. No.: 15,945

[22] Filed: Feb. 18, 1987

[51] Int. Cl.$^4$ .............................................. G09G 1/00
[52] U.S. Cl. .................................... 340/710; 340/706
[58] Field of Search ............... 340/710, 365 VL, 709, 340/365 R, 711, 706; 200/5 A; 161/44

[56] References Cited

U.S. PATENT DOCUMENTS

| | | | |
|---|---|---|---|
| 3,582,439 | 6/1971 | Thomas | 161/5 |
| 3,614,839 | 10/1971 | Thomas | 40/2.2 |
| 3,616,121 | 10/1971 | Freundlich | 161/44 |
| 3,943,645 | 3/1976 | Viesturs | 40/10 D |
| 4,197,151 | 4/1980 | Muzik | 156/249 |
| 4,343,851 | 8/1982 | Sheptak | 428/212 |
| 4,439,757 | 3/1984 | Gross et al. | 340/365 VL |
| 4,456,800 | 6/1984 | Holland | 200/5 A |
| 4,594,586 | 6/1986 | Hosogoe | 340/710 |
| 4,595,070 | 6/1986 | Hodges | 180/125 |

OTHER PUBLICATIONS

Mouse-Mat TM, American Covers Inc., no date avail. at time of prosecution, 800-228-8987.

Viso-Deskplate ®, Visual Desk Top Organizer-Advertisement (May, 1987).

Primary Examiner—Marshall M. Curtis
Assistant Examiner—Roland K. Bowler II
Attorney, Agent, or Firm—Workman, Nydegger, Jensen

[57] ABSTRACT

A mouse operating pad to permit high resolution operation of a mouse at a work station. The pad includes a control surface which incorporates a uniform random texture permitting the tracking member to stably rest at any point on the control surface. The control surface is formed on a control layer which is supported on a resilient intermediate layer. The hardness of the intermediate layer and the control layer is chosen so that the control surface is isolated from any imperfections in the work surface. The pad is placed on a work surface and the mouse is operated on the control surface. Optionally when the control layer is formed of a transparent material, an information display surface can be provided on the side of the control layer opposite from the control surface that allows visual information to be permanently displayed, or in one embodiment of the invention, removably displayed.

40 Claims, 2 Drawing Sheets

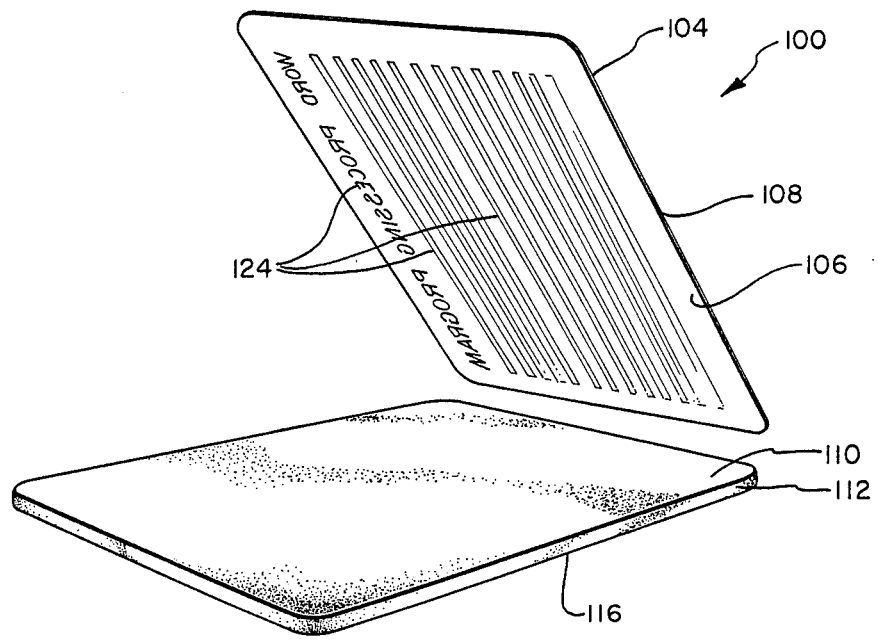
FIG. 3
FIG. 4
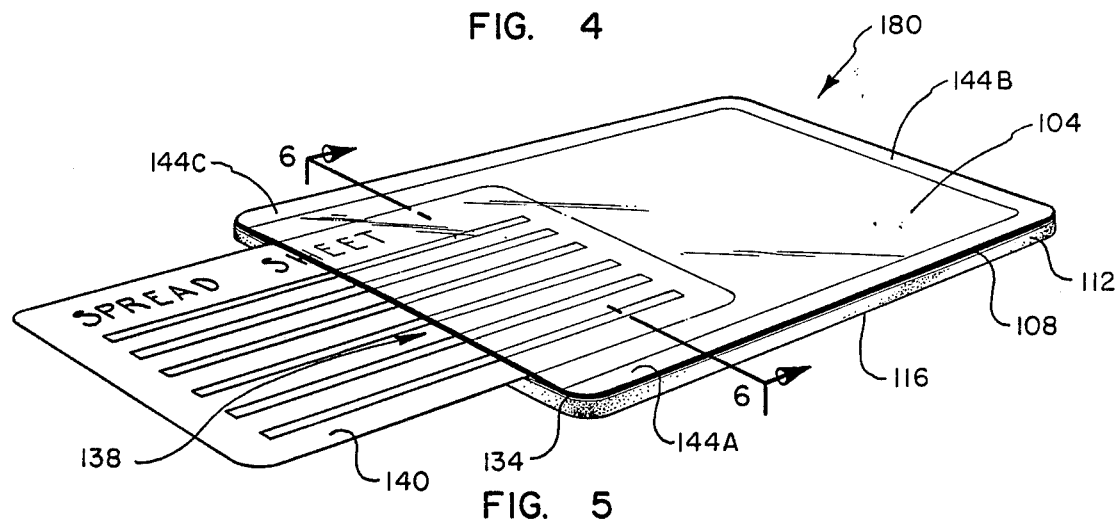
FIG. 5
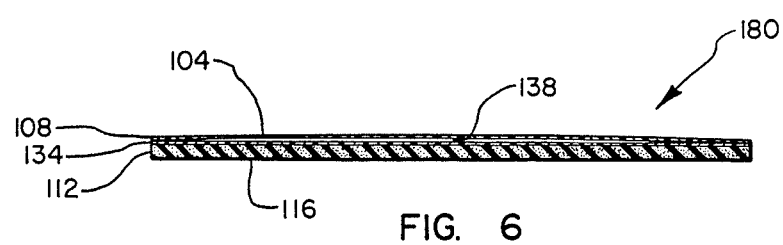
FIG. 6

MOUSE OPERATING PAD

BACKGROUND

1. The Field of the Invention

This invention relates to operating surfaces for the type of computer input device generally referred to as a mouse. More particularly, the present invention relates to pads which allow a user to operate a mouse with precision and ease.

2. The Prior Art

The fields relating to digital computer hardware and software have experienced tremendous expansion in recent years. In particular, the personal computer or microcomputer has made significant computing power and capabilities widely available.

As the speed, sophistication, and availability of computers has increased, various devices for improving the ease and speed of inputting information to a computer have been devised. Many of these methods and devices are "user friendly," in that they allow even the novice computer user to easily use a computer to perform useful tasks. Still further, even experienced and expert computer users are able to communicate with a computer faster and with greater ease than ever before using these newly developed methods and devices.

Such user friendly devices include transparent touch screen overlays, light pens, graphic tablets, joysticks, track balls, and mice. All of these devices were developed as alternatives to the "QWERTY" keyboard that had been the standard input device since the early days of digital computers. Of all the above-listed devices, the mouse has been determined to be the most efficient and also the most user friendly.

A mouse is a hand-held device operated on a flat surface which, in cooperation with the necessary computer hardware and software, allows the user to control the movement of a cursor or pointer on a computer display. For example, if the user desires to move the display pointer to the upper left of the display, the user merely properly orients the mouse on the flat operating surface (such as a table top) and pushes the mouse in the direction of the upper left corner of the display while watching the display. The pointer constantly changes its position to correspond to the relative change in position of the mouse. Thus, the user can guide the pointer to any position on the display by use of the mouse.

Use of a mouse can greatly increase the speed and ease of inputting commands to a computer. As an example, suppose that a user wanted the computer to erase everything that was found in a particular file that was presently open. Rather than typing a command on the keyboard (which may be just one of a hundred commands which must be memorized in order to efficiently use the computer) the user might move the mouse until the pointer on the display is adjacent to the word "erase" (or a stylized representation of a trash can) which might appear in the upper left corner of the display. Once the pointer is in position, the user would "enter" the command by depressing a button, or key, on the mouse and the computer would then proceed to erase that file.

As shown in FIG. 1, a typical mouse 10 has a generally mound-like body 14 to be grasped by the user and a control cable 32 connected to a computer. As can be seen in the cut away portion of FIG. 1, the most predominant component in the mouse is the track ball 28, which makes contact with and rolls upon a table surface 12 when the mouse 10 is moved across it. If the mouse 10 is to be used effective the linear movement of the mouse across the table surface 12 must be accurately translated into the rotational movement of the track ball 12. This can be frustrated by the fact that a work surface, such as table surface 12, will often include imperfections such as dents and cracks as shown at 34 in FIG. 1.

The rotational movement of the track ball 12 is converted into a corresponding electrical signal by the rotation of rollers 22, mounted on driving shafts 26, which in turn drive potentiometers 16 by way of interconnecting gears 18 and 20. The potentiometers 16 convert the rotational movement into a proportional electrical signal.

Mice using the scheme just described are generally referred to as mechanical mice. Other types of mice convert the movement of the track ball to an optical signal which is then converted into a corresponding electrical signal. Such mice are generally referred to optomechanical mice. Still further, some sophisticated mice do not employ any rotating tracking member, such as a track ball, but sense the direction and speed of movement of the mouse by other means. A brief review of various types of mice can be found in Teschler, L., "Interfacing Mice to Computers," 56 *Machine Design* 84 (1984).

The resolution of a mouse is critical in many applications. While some sophisticated mice are capable of resolutions of up to 1000 divisions per inch, most mechanical and optomechanical mice are capable of resolutions from 100 to 300 divisions per inch. A computer display is made up of thousands of image units termed "pixels." A pixel is the smallest indivisible point on a display which may be controlled, that is, turned on or off. Many high resolution displays, such as those used with computers intended for graphics generation, have a great number of pixels and a very high resolution. It is desirable that a mouse also have a high resolution so as to be capable of resolving many divisions per inch when being used with a high resolution display.

While mice are capable of achieving high resolutions, the work surface upon which mechanical and optomechanical mice are operated can have a profound effect on the resolution and the efficiency of the mouse. For example, if a work surface is imperfect it will not allow the tracking member of the mouse to maintain a one-to-one relationship between the linear movement of the mouse and the rotational movement of the track ball. Since few personal computer users work on geometrically perfect table tops, users often notice that the pointer moves erratically across the display.

The track balls used in mice are made of smooth or textured metal or may be coated with a rubber-like material. As can be appreciated, a spot of corrosion, or other imperfection, on the surface of the track ball can cause erratic pointer movement which is aggravating to the user. Similarly, an imperfect operating surface will cause the same aggravating erratic movement of the pointer. For example, a dusty, dirty, wet, or uneven operating surface will cause erratic pointer movement since the track ball is not able to maintain its rotational movement proportional to the linear movement of the mouse across the operating surface.

In an effort to solve the problems associated with imperfect work surfaces, mice have been operated upon pads placed on the work surface. Many of these pads, generally termed mouse pads, which are available in the prior art have operating surfaces that themselves contribute to erratic mouse operation. For example, some pads are covered with a coated fabric. Fabric often has an undesirable texture due to the uneven threads of which it is made. These tend to urge the track ball to rest at certain points on the pad and avoid others. Such a condition often causes user frustration, since the pointer seemingly "refuses" to position "itself" at the correct point when the track ball is stopped at some locations on the fabric type of pads.

Furthermore, mouse pads which are comprised of rubber and/or fabric covered rubber often are undesirable due to the fact that the operating surface this provided for the mouse is too soft. A soft operating surface requires the user to push the mouse with excessive force. Also, a soft operating surface can cause other difficulties.

For example, with many mechanical and optomechanical mice used on rubber and fabric pads, if excessive pressure is placed upon the housing of the mouse by the user to overcome the additional drag, the undersurface of the mouse may dig into the surface of the pad. Thus, a soft operating surface in mouse pads generally reduces the speed at which the user operates the mouse, both due to additional drag and to the underside of the mouse becoming caught in the soft material making up the pad.

Furthermore, mouse pads found in the prior art generally are provided with a porous operating surfaces which absorbs liquids. Thus, the material often used in the prior art mouse pads do not lend themselves to cleaning. As the mouse pad becomes soiled due to spills and user contact, it generally becomes unsightly and there is no practical method of cleaning it.

In general, there has been a widely felt need among users of mice for a mouse operating pad which alleviates the disadvantages associated with the previously available pads. The present invention solves the problems associated with the previously available pads and meets the needs of mice users.

BRIEF SUMMARY AND OBJECTS OF THE INVENTION

The present invention is a mouse pad that allows the user of a mouse to more efficiently and accurately control a mouse to communicate with a computer. The mouse pad of the present invention is provided with a flat control surface which is adapted for operating the mouse by the provision thereupon of a uniform random texture which improves the tracking of the mouse.

The material comprising the control surface is chosen to exhibit the proper hardness, so that the underside of the mouse does not deform the control surface and the tracking member does not experience excessive drag while moving across the control surface. The control surface is attached to, or alternatively formed integrally with, a resilient intermediate layer which isolates the control surface from uneveness in the work surface upon which the mouse pad is placed. The hardness of the resilient intermediate layer is also chosen so as to properly support the control surface. The side of the intermediate layer that contacts the work surface is provided with a gripping surface that affords a nonslip engagement with the work surface.

The control surface may be formed on a control layer which is attached to the intermediate layer, or formed integrally with the intermediate layer. In a transparent control layer an information display surface is provided on the side of the control layer opposite the control surface. The display surface allows visual information to be permanently displayed, or in one embodiment, removably displayed.

In view of the difficulties experienced by users of mouse pads available in the prior art, and the efforts in the prior art to alleviate these difficulties, it is a primary object of the present invention to provide a mouse pad which allows the mouse user to more efficiently and quickly manipulate a mouse, so as to increase the speed at which commands may be entered into a mouse-driven computer.

It is also an object of the present invention to provide a mouse pad which allows the user of a mouse to more accurately position a cursor or pointer on an interactive computer display where that position is controlled by a mouse.

Another object of the present invention is to provide a mouse pad which allows a mouse user to manipulate a mouse with less effort than that required with those mouse pads available in the prior art.

Still another object of the present invention is to provide a mouse pad which does not create excessive drag on the mouse tracking mechanism or housing.

Another object of the present invention is to provide a mouse pad with a control surface which is impervious to liquids and also easily cleanable.

Still another object of the present invention is to provide a mouse pad from which visual information may be displayed.

Yet another object of the present invention is to provide a mouse pad in which the display of visual information may be easily changed by the user.

These features and objects of the present invention, and others, will become more fully apparent in the following description of the preferred embodiments taken in connection with the drawings and the appended claims.

BRIEF DESCRIPTION OF THE DRAWINGS

FIG. 3 is an end view taken along line 3—3 of the embodiment shown in FIG. 2.

FIG. 4 is an exploded perspective view of another embodiment of the present invention.

FIG. 5 is a perspective view of yet another embodiment of the present invention.

FIG. 6 is an end view taken along line 6—6 of the embodiment shown in FIG. 5.

DETAILED DESCRIPTION OF THE PREFERRED EMBODIMENTS

In the following description of preferred embodiments, like structures will be referred to by like numerals throughout.

Figure 1:
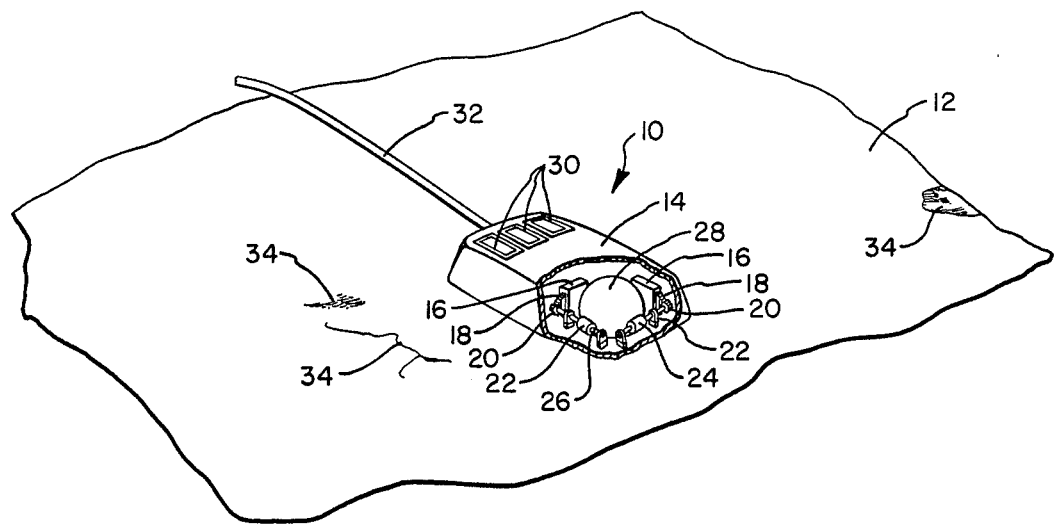
FIG. 1 is a partialy cutaway perspective view of a typical mouse device to be used with the present invention.
Figure 2:
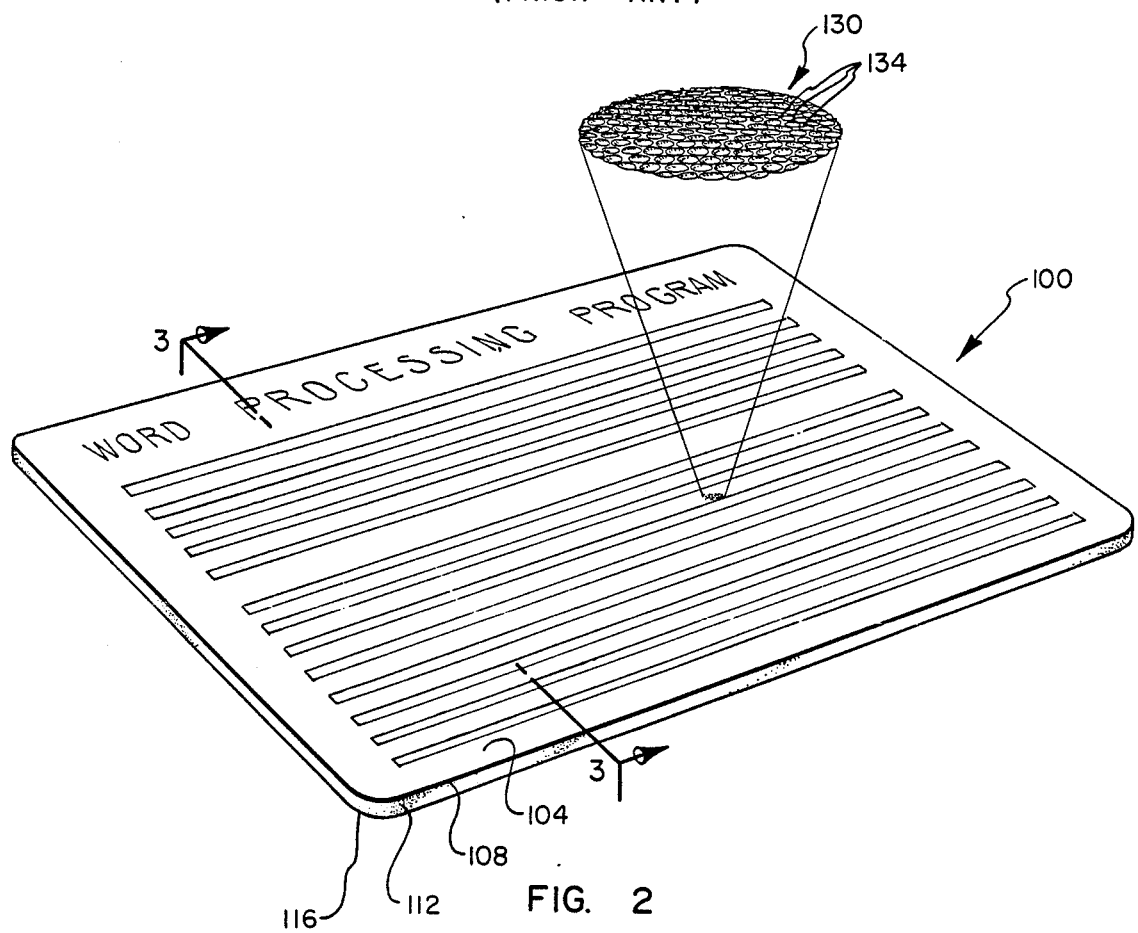
FIG. 2 is a perspective view of one embodiment of the present invention with an enlarged detail showing the texture of the control surface of the particular embodiment.

One embodiment of a mouse operating pad 100 according to the present invention is illustrated in FIGS. 2 and 3. Mouse operating pad 100 includes a control layer 108 having a control surface 104 formed on one side thereof, and an intermediate or support layer 112 upholding control layer 108 and having a gripping surface 116 on the side opposite control layer 108. In use, mouse pad 100 is placed on a work surface, such as the tabletop 12 shown in FIG. 1, with control surface 104 upward. Gripping surface 116 of intermediate layer 112 is thus in contact with the work surface. Lettering 124 shown in FIG. 4 is intended to represent one type of visual display which can be incorporated into a mouse pad according to the present invention.

Control surface 104 may be fabricated as an integral structure with intermediate layer 112 or may be formed on a separate control layer 108. As will be explained shortly, it is preferable that control surface 104 be formed on control layer 108.

The material presently preferred for control layer 108 is a polyvinyl chloride, such as that produced by Goss Plastics Film Corp. of Los Angeles, California under the trade name Goss 48.4. Scratch-resistant vinyl is the preferred material for control layer 108. The Goss material is provided with a desirable uniform random texture on one surface, which will be discussed shortly, and is available in thickness ranging from 10 to 20 mils. The 15 mil thick material is presently preferred.

Other materials which may be used for control layer 108 include textured polycarbonate materials available either from General Electric Company of Pittsfield, Mass. under the trademark LEXAN ®, or from any of Mobay Chemical Corporation, Plastics Division, of Pittsburgh, Pa., Rohm & Hass Co. of Philadelphia, Pa., and Humko Shefield Chemical of Memphis, Tenn. Still more materials that might be used as control layer 108 include polystyrene, polyester, or acetate films.

The hardness of control layer 108 is important to the present invention. It is presently preferred that control layer 108 have a hardness in the range of about 70 durometer to about 140 durometer, when measured on the "A" durometer scale with a hardness of 90 durometer being presently most preferred. Those skilled in the art will appreciate that a lower durometer number corresponds to a softer material. Such measurements should be made using an apparatus substantially meeting the American Society for Testing and Materials Standard D 2240-68, a standard method of test for identation hardness of rubber and plastic by means of a durometer promulgated in 1971. It may also be beneficial to provide the control layer material with anti-static properties. Also, for reasons that will be apparent shortly, it is preferred that the material used for the control layer 108 be transparent.

Intermediate layer 112 must also be comprised of a material which is the proper hardness, if control layer 108 is not to be allowed to deform unacceptably under the weight of the mouse and the user's hand. Alternatively, if intermediate layer 112 is too hard or to thin, imperfections in the work surface may not be isolated from control surface 104. The intermediate layer 108 material may usefully also be provided with anti-static properties.

Generally, it is desirable that intermediate layer 112 be comprised of a material having a hardness in the range of about 20 durometer to about 70 durometer when measured on the "A" durometer scale. The type of material, the thickness of the material, and the type and rigidity of the material used for control surface 108 will all have an effect on the proper hardness of the material comprising the intermediate layer 112.

It is important to the proper functioning of the present invention that control surface 104, and thus control layer 108, be as flat as possible. Thus, intermediate layer 112 is interposed between control layer 108 and the work surface so that any imperfections or anomalies, such as protrusions or depressions, found on the work surface are well isolated from control surface 104. If the intermediate layer 112 is comprised of a material which is too hard, the anomalies such as a ridge in the work surface, may be made manifest in the control layer 108. Conversely, if intermediate layer 112 is too soft, the imperfections on the work surface, such as depressions, may manifest themselves in the control layer 108.

It is presently preferred that intermediate layer 112 is also provided with a gripping surface 116 which allows the intermediate layer to engage the work surface in a nonslip fashion. Textures, such as a "cross hatch" texture, can accomplish this purpose, and methods of forming such textures on gripping surface 116 are well-known to those in the art of rubber and plastic fabrication.

In the discussion which follows, it will be helpful to primarily refer to the cross-sectional view of mouse operating pad 100 shown in FIG. 3. The cross-sectional view of FIG. 3 clearly shows the relationship between control layer 108, upon which is formed control surface 104, and intermediate layer 112, upon which is formed gripping surface 116.

Control layer 108 and resilient intermediate layer 112 may be separately formed and adhered together using an adhesive or some other method known to those skilled in the art. Preferably, support layer 112 is formed from 0.20 inch neoprene closed cell sponge rubber, such as that available from a variety of sources. Alternatively, intermediate layer 112 may be comprised of many other suitable materials known to those skilled in the art. For example, open cell neoprene sponge rubber, natural sponge rubber (both open and closed cell), vinyl sponge, and EPDM (ethelene, propelene, diene, terpolymer) sponge are among the many materials that can be used for intermediate layer 112.

To attach control layer 108 to intermediate layer 112, it is presently preferred that one of the adhesives known to those skilled in the art be used. Such adhesives include those manufactured by Minnesota Mining and Manufacturing Co. (for example 3M9721 and 3M9472), by Adchem of Westbury, N.Y. (for example MSC2AT, MSC3AT, MSC4AT, or MSC5AT), by Morgan Adhesive Co. of Artesia, Calif., or by the Fasson Group of Avery Internation Corp. of Pasadena, Calif.

An essential feature of the present invention is the texture which is imparted to the control surface. It is generally more commercially feasible to provide an appropriate texture and hardness for control surface 104 if a separate control layer 108 is used rather than if control surface 104 is integrally formed with intermediate layer 112. Thus, it is presently preferred that control layer 108 and intermediate layer 112 be separate structures joined by an adhesive as described above.

The texture of control surface 108 can best be described as a continuous uniform random texture. As shown in the enlarged section 130 of control surface 108 shown in FIG. 2, one presently preferred embodiment incorporates a control surface texture described in the art as a matte surface texture. The matte surface texture is generally comprised of a great number of plateau-like protrusions 134 scattered at random on the surface and each having a top at the same level. The spaces between the protrusions 134 must be small compared to the surface area of the tracking member which contacts the control surface 104.

Also, the arrangement of the texture should be random so that the tracking member will not favor any particular point on control surface 104, and so that the tracking member will come to a stable rest at any point on the control surface 104. The hardness of the control surface 104, and the intermediate layer 112, must be considered when choosing a control surface texture.

Many other textures could be incorporated into control surface 104 other than that shown in the enlarged portion of FIG. 2. For example, textures such as that described in the art as a velvet surface texture may also be used with the present invention. It may be necessary to choose between several commercially available matte or velvet surfaces, but examination of the available surface textures from various manufacturers in light of the ratings and descriptions of each will result in locating materials with textures suitable for use with the present invention. As an alternative to using commercially available textures, a material having a glossy or smooth surface can be textured or patterned using ultraviolet or solvent-based inks or other methods known to those in the art.

Since proper operation of a mouse relies upon the rotational movement of the tracking member maintaining a constant relationship with the linear movement of the mouse itself, it is important that control surface 104 be provided with some texture, as track balls may themselves be provided with smooth surfaces. Selecting a material of proper texture for control layer 104 can, therefore, usefully increase the frictional engagement between the track ball and control surface 104. Also, the inclusion of a texture on control surface 104 provides even better operation with a mouse having a track ball including a rubber-like outer surface. This frictional engagement facilitates maintaining a one-to-one relationship between the linear mouse movement and track ball rotation.

Another important feature of the present invention is the incorporation into the pad of visual displays which are apprehendable by the user. Many times a computer user needs for quick reference a list of particular commands to be used with a computer program. Alternatively, a supplier of computer hardware or software may desire to incorporate advertising into the mouse pad and distribute the mouse pads as promotional items. In either case, it is advantageous to include such visual information in the pad.

As shown in FIG. 4, a visual information display may be applied to control surface 104 itself, or to a display surface 106 on the opposite side of the control layer 108. In FIG. 4, the information 124 on display surface 106 is intended to represent commonly used commands in a word processing program. By incorporating the visual message on display surface 106, rather than on control surface 104, difficulties can be avoided that arise due to the information being worn off or interfering with the operation of a track ball when the information is placed on control surface 104.

The presently preferred method of manufacturing the mouse pad of the present invention first requires that the desired information be applied to display surface 106 as shown in FIG. 4. Generally, the information is printed upon display surface 106 using methods which are well known, but it has been found important to add adhesion enhancers to the inks used for printing on display surface 106.

Once the information is applied to display surface 106, an adhesive, of the kind generally described previously, is applied to display surface 106 or support surface 110. Naturally, the present invention includes mouse operating pads without any information on display surface 106. Control layer 108 is then bonded to intermediate layer 112 using whatever techniques are appropriate to the particular adhesive and materials being used. The finished product is then cut to the finished size, preferably by punching out the pad using known techniques.

Another preferred embodiment of a mouse operating pad 180 according to the present invention is illustrated in FIGS. 5 an 6. In mouse operating pad 180 the information display is a generally flat planar member 140, which may be ordinary paper. In mouse operating pad 180 control layer 108 is attached only along three of its peripheral edges 144A, 144B, 144C. A recess 138, shown in FIG. 6, is formed between control layer 108 and intermediate layer 112 into which a sheet of paper or other display carrying medium can be inserted.

Recess 138 is also in one aspect an expandable cavity, due to the fact that all of the materials of which it is formed are flexible, allowing for recess 138 to be expanded for easing insertion of planar member 140. In mouse operating pad 180, control layer 108 must be comprised of a transparent material in order that the display on planar member 140 inserted into recess 138 can be visible. All of the materials mentioned earlier, with their accompanying textures, generally provide an adequate transparency for this purpose.

In mouse operating pad 180 a base layer 134 is interposed between intermediate layer 112 and control layer 108. Base layer 134 is preferably an opaque glossy material. Any of the materials previously described for use as control layer 108 which are also available with a glossy surface, may be used as base layer 134.

The function of base layer 134 is to provide a nonfrictional surface which will make insertion and removal of planar member 140 into recess 138 easier than if intermediate layer 112 were left uncovered. An aesthetically enhanced mouse pad results when base layer 134 is opaque. Base layer 1 34 preferably has a thickness of 10 mils. The adhesives described earlier can be used to adhere base layer 134 to intermediate layer 112 and to adhere portions of the perimeter of control surface 108 to base layer 134.

It should be understood that whether or not a base layer, such as base layer 134, is interposed between control layer 104 and intermediate layer 112, intermediate layer 112 functions to uphold control layer 108 and control surface 104 thereon above the work surface upon which a mouse operating pad according to the present invention is placed. Thus, intermediate layer 112 functions in this manner in relation to control layer 108 whether or not it is in direct contact with control layer 108 and upholds control surface 104 whether or not it is integrally formed with control surface 104.

It will be appreciated that all of the various embodiments of the present invention provide solutions to those problems which have been felt by users of mice since the use of such devices began. Primarily, the present invention allows a mouse to be manipulated more quickly and accurately so as to be able to increase the speed at which commands may be entered into a mouse-driven computer. Also, the present invention allows a mouse to be nearly effortlessly guided across the control surface, thus reducing the fatigue and frustration of the user. Furthermore, the present invention provides a mouse pad which incorporates a control surface which is impervious to liquids and may be easily cleaned. Yet another important improvement that accompanies the present invention is the efficient display of information, whether permanently or replaceably, in a position which is easily viewable by the user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A mouse operating pad for use on a work surface at a work station to permit high resolution operating of a mouse at the work station, the mouse operating pad comprising:
   a control layer opposed first and second sides, said control layer being comprised of a first material;
   a control surface, formed on said first side of said control layer, for contact by a tracking member of the mouse;
   means for supporting said control layer and comprising first and second sides, one of which supports said control layer and the other side resting on said work station, said support means being comprised of a second material; and
   said support means and said control layer being attached together over a relatively small area and separable over the remainder of their overlying area,
   wherein said second material is relatively resilient in relation to said first material and wherein said first material is relatively hard in relation to said second material such that said first material is sufficiently resistant to deformation caused by moving or resting said mouse on the control surface to isolate said control surface from dimensional irregularities occurring at either of the first or second sides of said support means.

2. A mouse operating pad as defined in claim 1 wherein the first material is approximately 1.3 to 7 times harder than the second material.

3. A mouse operating pad as defined in claim 1 wherein the first side of said control layer is comprised of a uniform random texture permitting the tracking member of said mouse to stably rest at any point on the control surface.

4. A mouse operating pad as defined in claim 1 wherein the control layer is comprised of a polycarbonate material.

5. A mouse operating pad as defined in claim 1 wherein the control layer is comprised of a vinyl material.

6. A mouse operating pad as defined in claim 1 wherein the control layer is comprised of a polystyrene material.

7. A mouse operating pad as defined in claim 1 wherein the control layer is comprised of a polyester material.

8. A mouse operating pad as defined in claim 1 wherein the control layer has a thickness in the range of approximately 0.0005 to 0.0040 inches.

9. A mouse operating pad as defined in claim 1 wherein the control layer is comprised of a transparent material and the second side of the control layer is provided with visual information visually perceptable through the control layer.

10. A mouse operating pad as defined in claim 1 wherein the control layer is bonded to said resilient material along a portion of the perimeter thereof, whereby planar materials may be inserted between the control layer and the resilient material.

11. A mouse operating pad as defined in claim 10 wherein the control layer is comprised of a transparent material.

12. A mouse operating pad as defined in claim 1, further comprising a base layer disposed between the resilient material and the control layer, the control layer being bonded to the base layer along a portion of the perimeter thereof, whereby planar material may be inserted between the control layer and the base layer.

13. A mouse operating pad as defined in claim 12 wherein the control layer is comprised of a transparent material.

14. A mouse operating pad as defined in claim 1 wherein said first material has a hardness in the range of approximately 70 to 140 on the "a" durometer scale.

15. A mouse operating pad as defined in claim 14 wherein the second, resilient material comprises neoprene sponge rubber.

16. A mouse operating pad as defined in claim 14 wherein the second, resilient material comprises natural sponge rubber.

17. A mouse operating pad as defined in claim 14 wherein the second, resilient material comprises EPDM sponge.

18. A mouse operating pad as defined in claim 1 wherein the resilient material is adhered to the second side of the control layer.

19. A mouse operating pad as defined in claim 3 wherein the uniform random texture of the control surface comprises a matte texture.

20. A mouse operating pad as defined in claim 3 wherein the uniform random texture of the control surface comprises a velvet texture.

21. A mouse operating pad as defined in claim 1 wherein the uniform random texture of the control surface is a matte surface formed on the control surface.

22. A mouse operating pad as defined in claim 1 wherein the support means comprises a textured surface adapted to provide nonslip engagement with the work surface.

23. A mouse pad as defined in claim 1 wherein the support means comprises a layer of material having a hardness in the range of approximately 20 to 70 on the "a" durometer scale.

24. A mouse operating pad as defined in claim 1 wherein the support means comprises an anti-static material.

25. A pad for use on a work surface at a work station, said pad providing in combination capability for high resolution operation of a mouse at the work station, and/or visual display of information, the pad comprising:
   a control surface having a uniform random texture for frictionally engaging a tracking member of the mouse;
   an essentially transparent control layer having opposed first and second sides, the control surface being formed on the first side of the control layer, and said control layer being comprised of a first material that is resistant to deformation in response to movement or resting of said mouse on the control layer;

an intermediate layer comprised of a resilient second material and having opposed first and second sides, the second side of the control layer being attached to the first side of the intermediate layer along at least a portion of the peripheral edges thereof so as to form a recess between said control and intermediate layers into which an essentially flat medium containing visually perceptible information can be inserted and held in place, thereby providing visual display of the information through said transparent control layer; and a gripping surface formed on the second side of the intermediate layer to frictionally hold the intermediate layer in place on the work surface, and wherein said first material is sufficiently resistant to deformation and said second material is sufficiently resilient that in combination said first and second materials serve to essentially isolate the control surface from dimensional irregularities occurring at either of the first or second sides of the intermediate layer.

26. A pad as defined in claim 25 wherein the control layer is comprised of a polycarbonate material.

27. A pad as defined in claim 25 wherein the control layer has a thickness in the range of approximately 0.0005 to 0.0040 inches.

28. A pad as defined in claim 25 wherein the second side of the control layer is provided with visual information visually perceptable through the control layer.

29. A pad as recited in claim 25, further comprising a base layer disposed between the intermediate layer and the control layer, the control layer being bonded to the base layer along a portion of the perimeter thereof, whereby planar material may be inserted between the control layer and the base layer.

30. A pad as defined in claim 25 wherein the control layer comprises a material having a hardness in the range of approximately 70 to 140 on the "a" durometer scale.

31. A pad as defined in claim 25 wherein the uniform random texture of the control surface results from a matter surface formed on the control surface.

32. A pad as defined in claim 25 wherein the uniform random texture of the control surface comprises a velvet texture.

33. A pad as definded in claim 25 wherein the intermediate layer comprises a material having a hardness in the range of approximately 20 to 70 on the "a" durometer scale.

34. A pad as defined in claim 25 wherein the intermediate layer comprises neoprene sponge rubber.

35. A pad as defined in claim 25 wherein the intermediate layer comprises an anti-static material.

36. A pad for use on a work surface at a work station to permit high resolution operation of a mouse at the work station, as well as visual display of information held by the pad, the pad comprising:

a control layer comprising a transparent material and having formed on a first side thereof a control surface of uniform random texture for frictional contact by a tracking member of a mouse;

a resilient intermediate layer interposed between the control layer and the work surface when the pad is placed upon the work surface, said transparent material being relatively hard in relation to said resilient material such that said transparent material is sufficiently resistant to deformation caused by moving or resting said mouse on the control surfce, such that irregularities in said work surface are effectively isolated from said control surface by the combination of said transparent and resilient materials;

a relatively smooth, low-friction base layer interposed between the control layer and the resilient intermediate layer; and a recess formed between the control layer and the base layer to enable the removable insertion of planar material containing visually perceptible information between the control layer and base layer.

37. A pad as defined in claim 36 wherein an information display surface is located on a second side of the control layer opposite the first side thereof.

38. A pad as defined in claim 36 wherein a first side of the base layer is adhered to a first side of the resilient intermediate layer.

39. A pad as defined in claim 38 wherein an opening is formed along at least one edge of the perimeter of the pad, whereby planar materials may be inserted between the control layer and the resilient intermediate layer.

40. A pad as defined in claim 36 wherein the resilient intermediate layer and the control layer are comprised of an anti-static material.

* * * * *

UNITED STATES PATENT AND TRADEMARK OFFICE
CERTIFICATE OF CORRECTION

PATENT NO. : 4,799,054

DATED : January 17, 1989

INVENTOR(S) : V. Dean House

It is certified that error appears in the above-identified patent and that said Letters Patent is hereby corrected as shown below:

Column 1, line 66, "cut away portion" should be --cutaway portion--

Column 5, line 53, to thin" should be --too thin--

Column 8, line 41, "1 34" should be --134--

Column 10, line 23, " "a" durometer scale " should be -- "A" durometer scale--

Column 10, line 52," "a" durometer scale " should be -- "A" durometer scale--

Column 11, line 41, " "a" durometer scale " should be --"A" durometer scale--

Column 11, line 45, "matter surface" should be --matte surface--

Column 12, line 3, " "a" durometer scale " should be -- "A" durometer scale--

Signed and Sealed this

Thirtieth Day of January, 1990

Attest:

JEFFREY M. SAMUELS

*Attesting Officer*   *Acting Commissioner of Patents and Trademarks*